3,650,986
CARRIER CATALYST FOR THE MANUFACTURE OF UNSATURATED ESTERS OF CARBOXYLIC ACIDS

Kurt Sennewald and Wilhelm Vogt, Knapsack, near Cologne, Heinz Erpenbach, Surth, near Cologne, Hermann Glaser, Knapsack, near Cologne, and Helmut Dyrschka, Kottingen, Germany, assignors to Knapsack Aktiengesellschaft, Knapsack, near Cologne, Germany
No Drawing. Filed Dec. 5, 1968, Ser. No. 781,627
Claims priority, application Germany, Dec. 23, 1967,
P 16 67 140.2
Int. Cl. C07c 67/04
U.S. Cl. 252—431 C      4 Claims

ABSTRACT OF THE DISCLOSURE

Carrier catalyst—and process for making and activating it—for the production of unsaturated esters of carboxylic acids from an olefinic compound, a carboxylic acid and molecular oxygen in the gas phase, the carrier catalyst containing palladium acetate, alkali metal acetate and one or more uranium compounds as its active constituents.

---

It is known that unsaturated esters of carboxylic acids can be produced by reaction of an olefinic compound and an aliphatic or aromatic carboxylic acid with molecular oxygen or air in the gas phase, at elevated temperature, and in contact wtih a carrier catalyst containing one or more compounds of ruthenium, rhodium, palladium, osmium, iridium or platinum, if desired in combination with one or more compounds of copper, silver, gold, zinc, cadmium, tin, lead, chromium, molybdenum, tungsten, manganese, iron, cobalt or nickel, and in further combination with one or more alkali metal or alkaline earth metal carboxylates. The reaction occurs in accordance with the known summation equation:

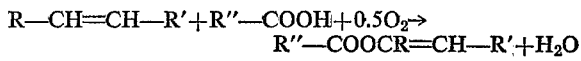
R—CH=CH—R'+R"—COOH+0.5O$_2$→
R"—COOCR=CH—R'+H$_2$O in which R, R', and R" stand for hydrogen or aliphatic, cycloaliphatic or aromatic radicals containing up to 17 carbon atoms. For example, the technically very interesting product vinyl acetate can be produced by reaction of ethylene, acetic acid and oxygen.

In view of the high price of the catalysts, which is incurred by their noble metal content, it is highly desirable for the economic use of the process to have a catalyst which combines long lifetime with good space/time yields, and produces generally good yields.

The present invention now provides a carrier catalyst for the production of unsaturated esters of carboxylic acids by reaction of an olefinic compound, a carboxylic acid and molecular oxygen in the gas phase, the catalyst containing palladium acetate, alkali metal acetate and one or more uranium compounds as its active constituents.

The catalyst can contain silicic acid, kieselguhr, silica gel, diatomaceous earth, aluminum oxide, aluminum silicate, aluminum phosphate, pumice, silicon carbide, asbestos or active carbon as the carrier material, and between 0.1 and 20, preferably between 0.2 and 10, percent by weight palladium acetate, between 0.1 and 20, preferably between 0.2 and 10, percent by weight alkali metal acetate, and between 0.1 and 10, preferably between 0.2 and 8, percent by weight of one or more uranium compounds as the active constituents, uranyl acetate being particularly preferred.

The invention also relates to a process for making the above carrier catalyst, which comprises impregnating one or more of above carriers with a solution of palladium acetate, uranyl acetate and alkali metal acetate in acetic acid and drying the carrier so impregnated. A variant of this process comprises impregnating the carrier with a palladium acetate solution in pure acetic acid, drying the carrier so impregnated, impregnating the dried carrier again, this time with an aqueous solution of uranyl acetate and alkali metal acetate, and drying the carrier so impregnated.

After having been dried, for example in vacuum drying cabinet at a temperature of about 50° C., the powdery catalyst spread out in a thin layer, which is repeatedly turned, can be activated by irradiation with ultraviolet and/or visible light, for a period of time between 30 minutes and 10 hours. In order to produce an effect, it is generally necessary for the catalyst to absorb per liter a quantity of light between 0.1 and 100, preferably between 1 and 50 watt-hours. A catalyst so treated enables the space/time yield obtainable therewith to be increased by 60 to 80%, as compared with the space/time yield obtainable with an unexposed catalyst. The catalyst treated in the manner described above is placed in a stainless steel tube and a gas mixture consisting of the olefin to undergo reaction, carboxylic acid in vapor form and oxygen is passed over it at temperatures between 120 and 250° C., preferably between 150 and 200° C., and under pressures between 0.5 and 20, preferably between 2 and 10, atmospheres absolute. The reaction mixture leaving the reactor is condensed to isolate the reaction products and recover unreacted carboxylic acid. For example, the reaction of ethylene as the olefin with acetic acid as the carboxylic acid at 180° C., and under a pressure of 6 atmospheres absolute in contact with a palladium acetate/uranyl acetate/potassium acetate-catalyst on a silicic acid carrier has been found to produce the following results: a space/time yield of 94 grams vinyl acetate per liter of catalyst per hour, for the unexposed catalyst, and a space/time yield of 160 grams vinyl acetate per liter of catalyst per hour, for the irradiated catalyst.

EXAMPLE 1.—(Comparative example)

1 liter of a silica acid carrier, which had a BET-surface of 120 square meters/gram and an apparent density of 0.52 kg./liter, was impregnated with a solution of 7.8 grams palladium acetate and 20 grams potassium acetate in 800 cc. pure acetic acid. The carrier was found practically to absorb the whole amount of liquid. The carrier so impregnated was dried in vacuo at 50° C. and was then ready for use. The carrier catalyst so made contained 1.5% by weight palladium acetate and 3.85% by weight potassium acetate.

The catalyst was placed in a stainless steel tube 25 mm. wide, which was heated by means of a steam jacket and provided with a temperature control device. A mixture of 750 grams/hr. acetic acid in vapor form, 750 normal liters/hr. (measured at N.T.P.) ethylene and 450 normal liters/hr. air was passed over the catalyst at a temperature of 180° C. and under a pressure of 6 atmospheres absolute. The reaction gas was cooled using water and a freezing mixture to condense out the reaction product and unreacted acetic acid. The analysis of the reaction mixture indicated a space/time yield of 50 grams vinyl acetate per liter of catalyst per hour.

EXAMPLE 2

1 liter of the catalyst carrier material of Example 1 was impregnated with a solution of 7.8 grams palladium acetate, 20 grams potassium acetate and 18 grams uranyl acetate (UO$_2$(CH$_3$COO)$_2$·2H$_2$O) in acetic acid. The solution was used in a quantity just sufficient to permit absorption thereof by the catalyst mass. The catalyst so impregnated was dried in vacuo at 50° C. and immediately placed in the reaction furnace, without any further treatment. The carrier catalyst so made was found to contain 1.5% by weight palladium acetate, 3.85% by weight potassium acetate and 3.17% by weight anhydrous uranyl acetate. Under the conditions described in Example 1, the catalyst was found to produce a space/time yield between 90 and 100 grams vinyl acetate per liter of catalyst per hour, for an average yield of 88 to 89%, referred to the ethylene transformed. The catalytic activity could not be found to have died down, after an operation period of 4 weeks.

EXAMPLE 3

The dried catalyst of Example 2 was irradiated for 4 hours using a 700 watt-lamp, at a distance of 60 cm. Under the conditions reported in Example 1, the catalyst so activated was found to produce a space/time yield of 160 grams vinyl acetate per liter of catalyst per hour, for an average yield of 89 to 90%, referred to the ethylene transformed. The catalytic activity could not be found to have died down, after an operation period of 4 weeks.

We claim:

1. A carrier catalyst for the production of an unsaturated carboxylic acid ester from an olefinic compound, a carboxylic acid and molecular oxygen in the gas phase, the catalyst containing between 0.1 and 20% by weight palladium acetate, between 0.1 and 20% by weight alkali metal acetate and between 0.1 and 10% by weight of uranyl acetate as its active constituents.

2. The carrier catalyst defined in claim 1 containing a carrier selected from the group consisting of silicic acid, kieselguhr, silica gel, diatomaceous earth, aluminum oxide, aluminum silicate, aluminum phosphate, pumice, silicon carbide, asbestos and active carbon.

3. The carrier catalyst defined in claim 1 containing between 0.2 and 10% by weight palladium acetate, between 0.2 and 10% by weight alkali metal acetate and between 0.2 and 8% by weight of uranyl acetate as its active constituents.

4. The carrier catalyst defined in claim 1 which has been activated by irradiation with ultraviolet or visible light.

References Cited

UNITED STATES PATENTS

| 2,586,812 | 2/1952 | Gehrke | 252—43 Carb |
| 3,275,680 | 9/1966 | Holzrichter et al. | 260—497 A |
| 3,278,590 | 10/1966 | Clark et al. | 260—497 A |

PATRICK P. GARVIN, Primary Examiner

U.S. Cl. X.R.

260—497